United States Patent [19]

Shin

[11] Patent Number: 4,876,159
[45] Date of Patent: Oct. 24, 1989

[54] MAGNETROOPTICAL RECORDING MEDIA AND METHOD OF PREPARING THEM

[75] Inventor: Sung-Chul Shin, Rochester, N.Y.

[73] Assignee: Eastman Kodak Company, Rochester, N.Y.

[21] Appl. No.: 168,104

[22] Filed: Mar. 14, 1988

[51] Int. Cl.$^4$ .............................................. B32B 5/00
[52] U.S. Cl. ............................... 428/607; 204/192.15; 204/192.2; 420/83; 427/132; 428/653; 428/694; 428/928
[58] Field of Search ............... 428/607, 678, 681, 694, 428/900, 928, 653; 420/83; 148/101, 301, 403; 204/192.15, 192.2; 427/131, 132; 360/114; 365/122

[56] References Cited

U.S. PATENT DOCUMENTS

| | | | |
|---|---|---|---|
| 3,397,084 | 8/1968 | Krieglstein | 427/62 |
| 4,024,299 | 5/1977 | Smeggil | 427/130 |
| 4,042,341 | 8/1977 | Smeggil | 428/678 |
| 4,065,781 | 12/1977 | Gutknecht | 357/23.7 |
| 4,170,689 | 10/1979 | Katsui et al. | 428/457 |
| 4,576,699 | 3/1986 | Sato et al. | 204/192.26 |
| 4,612,068 | 9/1986 | Tanaka et al. | 420/83 |
| 4,670,353 | 6/1987 | Sakurai | 428/606 |
| 4,670,356 | 6/1987 | Sato et al. | 428/693 |
| 4,727,005 | 2/1988 | Sato | 428/678 |

OTHER PUBLICATIONS

Tsujimoto et al., "Magnetic and Magneto-Optic Properties of Amorphous TbFeCo Magnetic Films", IEEE Transactions on Magnetics, vol. Mag-19, No. 5, Sep. 1983, pp. 1757-1759.
Tsujimoto et al., "Magnetic Properties and Magnetic Kerr Rotation of Amorphous TbFeCo and TbFeCr Films", Journal of Magnetism and Magnetic Materials, 35, (1983), pp. 199-210.
Sato, "Magnetic Properties of Amorphous Tb-Fe Thin Films with an Artificially Layered Structure", J. Appl. Phys., 59, Apr. 1986, pp. 2514-2520.
Tanaka et al., "Dynamic Read/Write Characteristics of Magneto-Optical TbFeCo and DyFeCo Disk", IEEE Transactions on Magnetics, vol. Mag-20, No. 5, Sep. 1984, pp. 1033-1035.

Primary Examiner—Robert L. McDowell
Attorney, Agent, or Firm—Robert A. Gerlach

[57] ABSTRACT

Inhomogeneous mixed magnetooptical films having unique properties are prepared by evaporating a rare earth metal and a transition metal and sequentially depositing the rare earth and transition metals on a substrate at a maximum repeat distance of 21 angstroms.

11 Claims, 4 Drawing Sheets

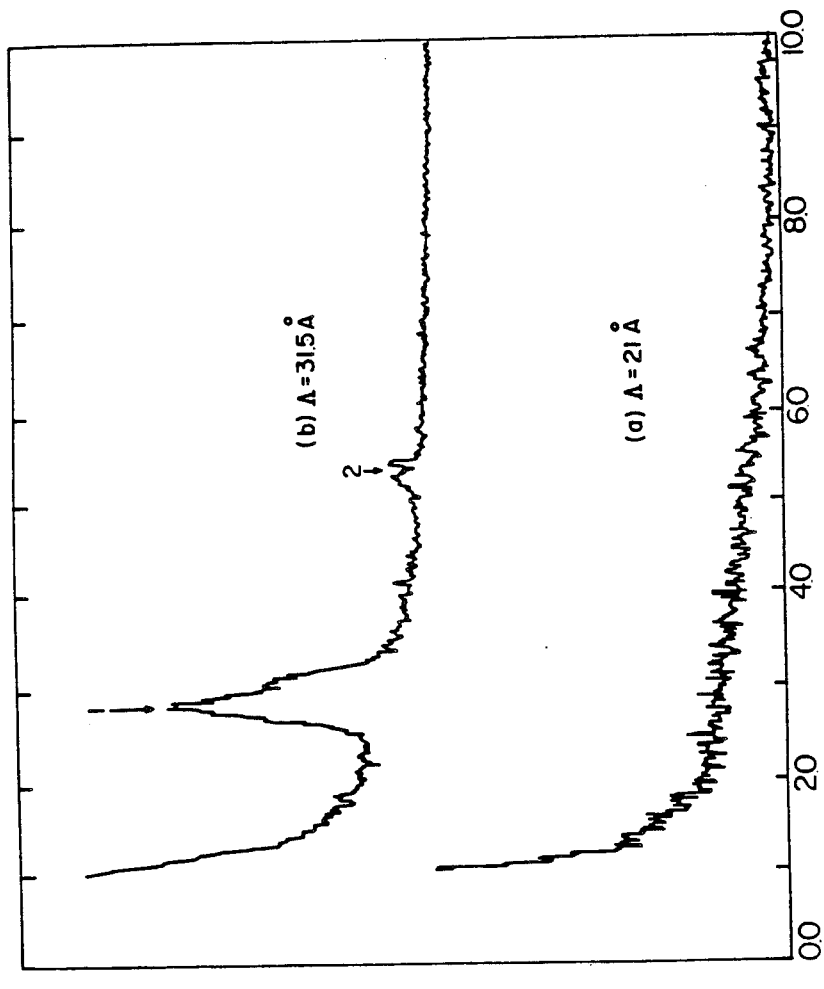

MAGNETROOPTICAL RECORDING MEDIA AND METHOD OF PREPARING THEM

BACKGROUND OF THE INVENTION

This invention relates to sequentially deposited inhomogeneous magnetooptical recording media having novel properties.

Desirable magnetooptical films are those which are eraseable and on which signals can be written at high density with small light-thermal energy at good writing and read-out efficiency. In such films, the signal of the recording medium is proportional to the polar Kerr rotation angle while the sensitivity of the medium depends its the coercitivy.

One of the difficulties involved in producing such films resides in the fact that the Kerr rotation angle and the coercive force change independently for any given alloy so that a composition having a large Kerr rotation angle does not always have the desired coercitivy. Several investigators have reported on the relationship between the Kerr rotation angle and the composition of alloy films. Tsujimoto et al (*Magnetic and magneto-optic properties of amorphous TbFeCo magnetic films*, IEEE Transactions on Magnetics, Vol. Mag-19, No 5, September 1983, pp. 1757-1759) and U.S. Pat. No. 4,670,353 teach that a high angle of Kerr rotation can be obtained when Co is substituted for a portion of the Fe in amorphous TbFe magnetooptical films.

It has been found, however, that the method used to prepare a film and the control of specific parameters can critically influence both the Kerr rotation angle and coercivity to provide magnetooptical media having novel properties even when produced from TbFeCo alloy compositions.

SUMMARY OF INVENTION

This invention provides magnetooptical recording media having novel properties and a method for preparing them which comprises evaporating a rare earth and a transition metal and sequentially depositing them on a substrate at a maximum repeat distance of about 21 angstroms to form a nonhomogeneous mixed film. Rare earth-transition metal films of the invention are inhomogeneous due to the non-homogeneous mixing of the sequentially deposited sublayers, possibly due to island formation of the sublayers at such small thicknesses. By contrast, magnetooptical films produced by sequential deposition of evaporated metals at repeat distances greater than 21 angstroms have a layered structure.

The films of the invention also have a Kerr rotation angle substantially the same as that of coevaporated films while their coercivity is equal to or less than that of coevaporated films. At repeat distances of 14 angstroms or less, the films of the invention have coercivities lower than those of corresponding coevaporated films.

BRIEF DESCRIPTION OF THE DRAWINGS

FIG. 3 is a pair of low angle X-ray diffraction patterns for TbFeCo samples prepared at repeat distances of 21 and 31.5 angstroms.

DETAILED DESCRIPTION OF THE INVENTION

Magnetooptical films produced by the sequential deposition of the rare earth and transition metals at repeat distances of about 21 angstroms or less possess unique properties that make them particularly useful as magnetooptical recording media. For the purposes of the invention, the lower limit of repeat distance is solely limited by the capability of the apparatus or equipment used to prepare the product.

As used herein the term repeat distance is distinguished from thickness which refers to sublayer thickness or the thickness of each component such as the Tb layer and the FeCo layer of the examples. Thickness is derived from the equation $$\text{Thickness} = R \times t$$

where R is the deposition rate and t is the exposure time of the substrate to the incoming flux. This provides a mathematical average thickness for a layer which can also be measured analytically, for example by quartz crystal sensor.

Repeat distance is the summation of the thicknesses of a single set of sublayers such as one of the Tb and one of the FeCo layers of the examples. As used herein, repeat distance refers to the repeat distance used during the sample fabrication process and not in the sample itself. Once the layers are mixed with one another in the film products of the invention, the term repeat distance is meaningless.

The rare earth-transition metal films of the invention have the same Kerr rotation angles as corresponding coevaporated films. The angle of Kerr rotation is defined by an amount of rotation of a polarized light from an incident linearly polarized light when it is reflected at a magnetic thin film.

Figure 1:
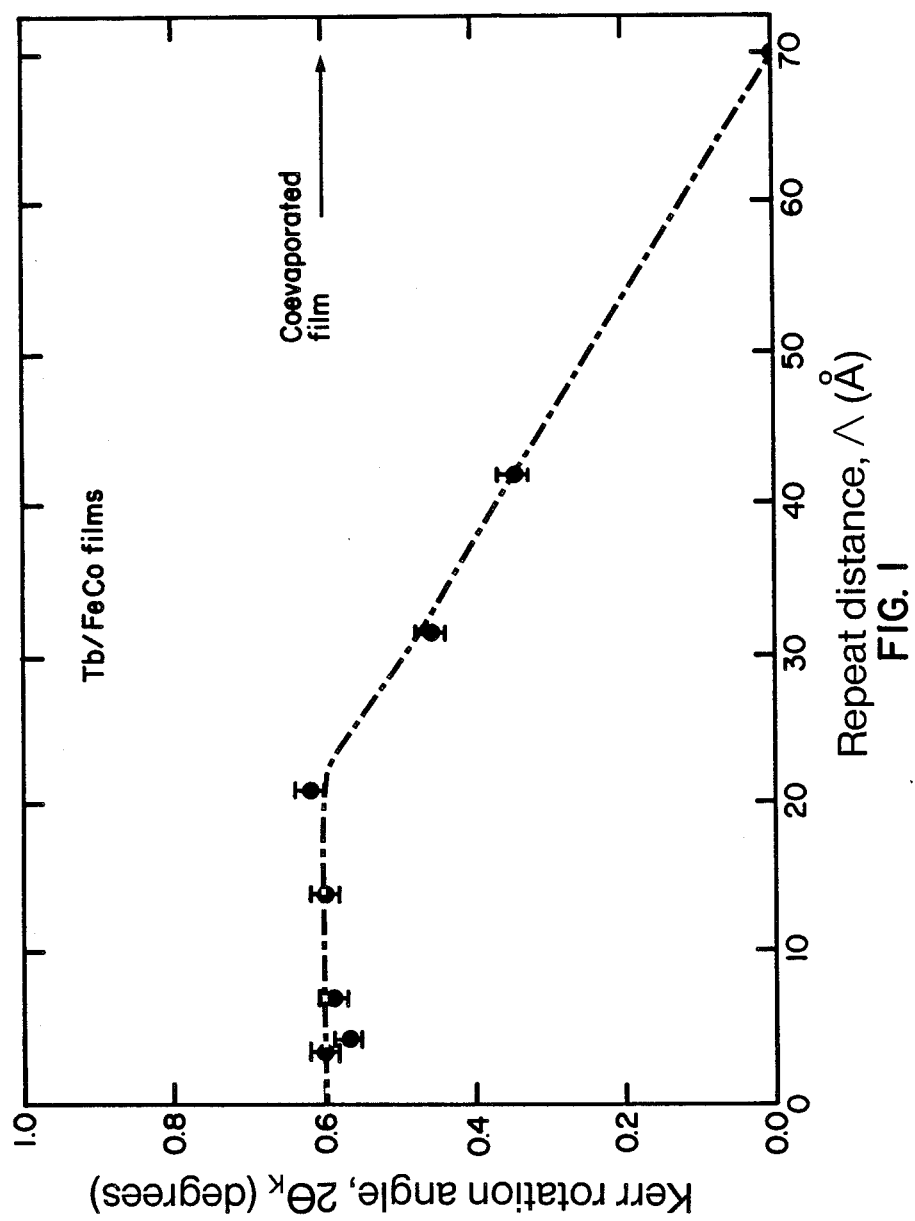
FIG. 1 is a graph showing the dependence of the Kerr rotation angle on repeat distance in sequentially deposited Tb/FeCo films.

The dependence of the Kerr rotation angle on the repeat distance is plotted in FIG. 1. The data of the Kerr rotation angle were obtained using a 632.8 nm HeNe laser for a set of representative films having the composition of $Tb_{21}(Fe_{95}Co_5)_{79}$. As the curve shows, a Kerr rotation angle of about 0.6° is constant for sequential deposition in accordance with the invention to produce a nonhomogeneous mixed TbFeCo alloy product. The Kerr rotation angle is the same as that of a coevaporated film of the same composition. FIG. 1 shows that the remnant Kerr rotation angle (Kerr angle at zero applied field) is essentially the same as that of a coevaporated sample until the repeat distance exceeds 21 angstroms. At that point, the residual Kerr rotation angle becomes smaller as the repeat distance increases until no Kerr rotation is developed at a repeat distance of about 70 angstroms.

Figure 2:
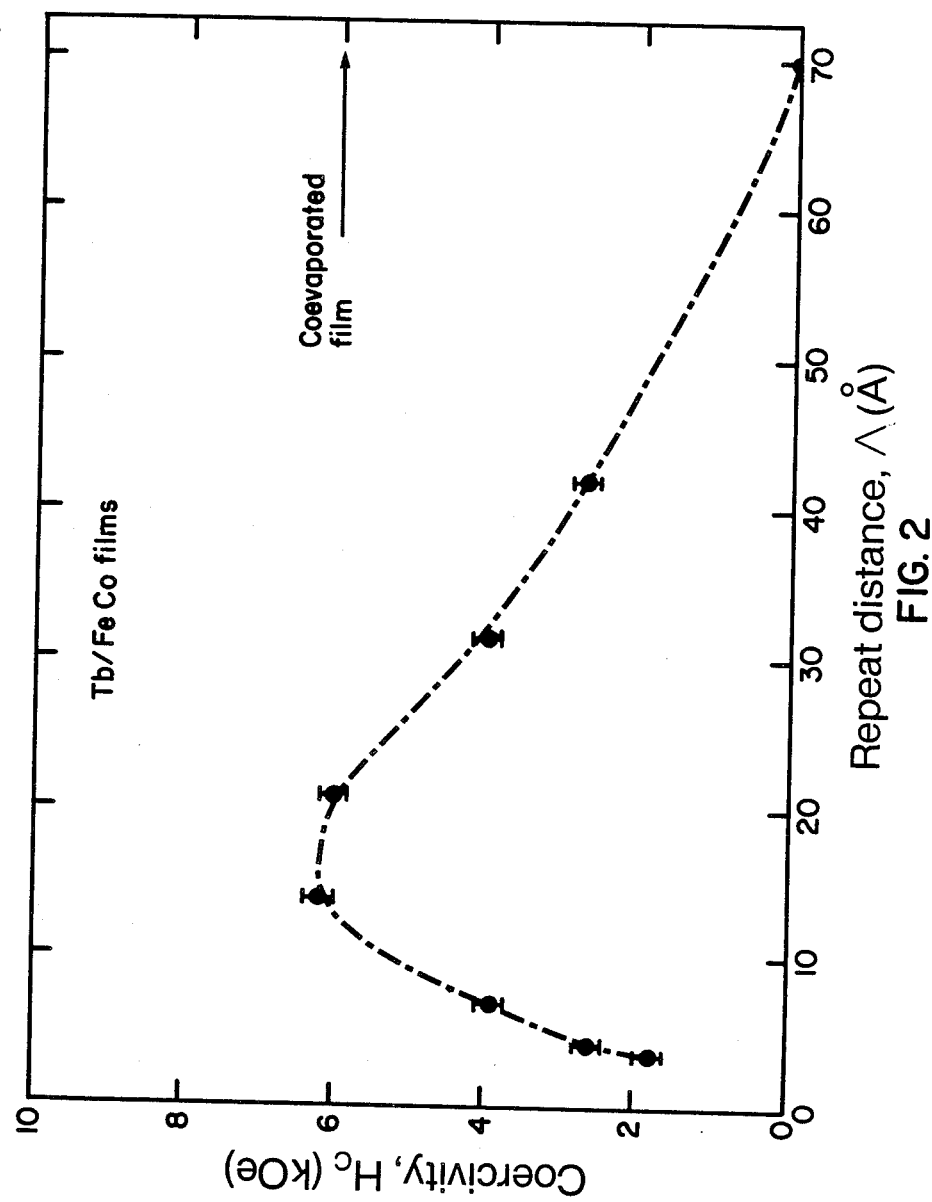
FIG. 2 charts the dependence of coercitivy on the repeat distance in sequentially deposited Tb/FeCo films.

Rare earth-transition metal films prepared by the sequential deposition of the metals at repeat distance of 14 angstroms or less can have an even smaller coercivity, hence higher sensitivity, than corresponding coevaporated films as shown in FIG. 2 for the representative TbFeCo films composition of FIG. 1. The coercivity can be obtained from a Kerr hysteresis loop which is obtained by measuring the Kerr angle while continuously increasing the magnetic field. The coercivity is the magnetic field required to reduce the magnetization of a film to zero.

FIG. 2 illustrates the dependence of coercivity on repeat distance as obtained from the polar Kerr hysteresis loop. As the curve shows, a broad maximum of coercivity occurs at a repeat distance of from about 14 to about 21 angstroms where the coercivity of a film prepared by sequential deposition is the same as that of a coevaporated sample of the same composition. At repeat distances of less than about 14 angstroms, particularly useful products for magnetooptical media are produced since sequential deposition provides lower coercivities than those of coevaporated samples with no decrease in the Kerr rotation angle. As FIG. 2 shows, the coercivity of a sample produced by sequential deposition in accordance with the invention at a repeat distance of about 3.5 angstroms is one third that of a coevaporated sample. The same or similar Kerr rotation angle and coercivity results are obtained for samples having different compositions, particularly for TbFeCo compositions.

This phenomenon makes it possible to control the coercivity by controlling the repeat distance. Accordingly, the coercivity can be tailored to the intensity of the writing source or vice versa. Another advantage of the invention derives from the increased sensitivity of the novel films of the invention, particularly when produced by sequential deposition at repeat distances below about 14 angstroms. This sensitivity makes it unnecessary to employ high powered lasers for writing with films having a coercivity of about 2 KOe providing the most advantageous combination of easy writing and stability against erasure or exposure to ordinary everyday magnetic influences.

While the films of the invention are inhomogeneous, their low angle diffraction patterns do not contain the peaks that characterize a layered structure. Such peaks are derived from or related to an artificial periodicity as determined by the formula 2( Repeat distance) sin B=n$\lambda$ where B is the position of a diffraction peak, n is the order of reflection, and $\lambda$ is the X-ray wavelength. FIG. 3 shows X-ray diffraction pattern (a) which is devoid of such low angle diffraction peaks for films prepared from the thermally evaporated metals of FIG. 1 sequentially deposited at a repeat distance of 21 angstroms. By contrast, pattern (b) contains peaks corresponding to the artificial periodicity one would expect to observe at low diffraction angles for a layered structure when a film is prepared from the same composition but at a repeat distance greater than 21 angstroms.

Although the theory of operation of the invention is not understood, one can hypothesize that the decrease in the Kerr rotation angle and coercivity in samples prepared by the sequential deposition of thermally evaporated metals at repeat distances greater than 21 angstroms might be due to in-plane magnetization introduced by the existence of an uncoupled transition metal layer. However, there appears to be no theory or hypothesis to explain or suggest the unique relationship between the novel characteristics of the films of the invention and repeat distances of 21 angstroms or less for the sequential deposition of thermally evaporated metals. One might speculate that non-homogeneous mixing of the evaporated components, due to island formation of thin sublayer thicknesses, takes place until a certain minimum repeat distance is reached due to island formation for thin sublayer thicknesses. Since the coercivity is sensitive to atomic structural configuration, one might ascribe the novel coercivity characteristic of samples prepared at repeat distances below about 14 angstroms to a change in atomic pair-ordering depending on the local atomic configuration. The insensitivity of the Kerr rotation angle to decreases in the repeat distance in the sequentially deposited samples might be due to the relative insensitivity of the Kerr rotation angle to microstructural variation since the Kerr rotation mainly derives from the transition metal constituent in the antiferromagnetic coupling. However, these are mere hypotheses.

In the practice of the invention, the evaporation of the rare earth and transition metal to form the film on the substrate by sequential deposition is as critical to the results achieved as the repeat distance. The method by which the repeat distances and sequential deposition are achieved and the sequence of deposition, however, are not critical. Any number of conventional techniques can be used to produce the novel films of the invention provided they permit the sequential deposition of the metals on a substrate surface. Accordingly, any suitable method may be employed including thermal evaporation of the rare earth and transition metal in a vacuum chamber with sequential exposure of the substrate and repeat distances achieved by rotating the substrate.

While any suitable rare earth and transition metals can be employed in the practice of the invention, it is preferred to use Tb, Fe, and Co, with the latter two most preferably used in the form of an FeCo alloy. Preferred compositions are described in U.S. Pat. No. 4,670,353, the disclosure of which is hereby incorporated by reference. Any other sutiable rare earth metals can also be used including Gd, Ce, Er, Dy, Sm, Ho, Nd, Pr, Tm, La, Y, and the like and mixtures thereof. Any suitable ratio of the rare earth metal or metals to the transition metal or metals can be employed depending on the desired composition of the film product.

As described herein, the rare earth, and transition metals are deposited from different sources and more than one of each or alloys of two or more can be used. Further, each of the metals or combinations thereof may be provided from a plurality of sources.

The films of the invention can be deposited on any suitable solid substrate which should be substantially inert to deposition conditions and non-magnetic, or so weakly magnetic as not to diminish the magnetic properties of the magnetic film to be formed thereon. The size and shape of the substrate is not critical and it can be flexible or rigid depending on its application. The substrate can be in the form of a disk, tape, foil, wire or the like made of any suitable material such as glass, plastics, including acrylic, polycarbonate, polyester and polyamide resins and the like, and mon-magnetic metals such as aluminum and copper.

Figure 4:
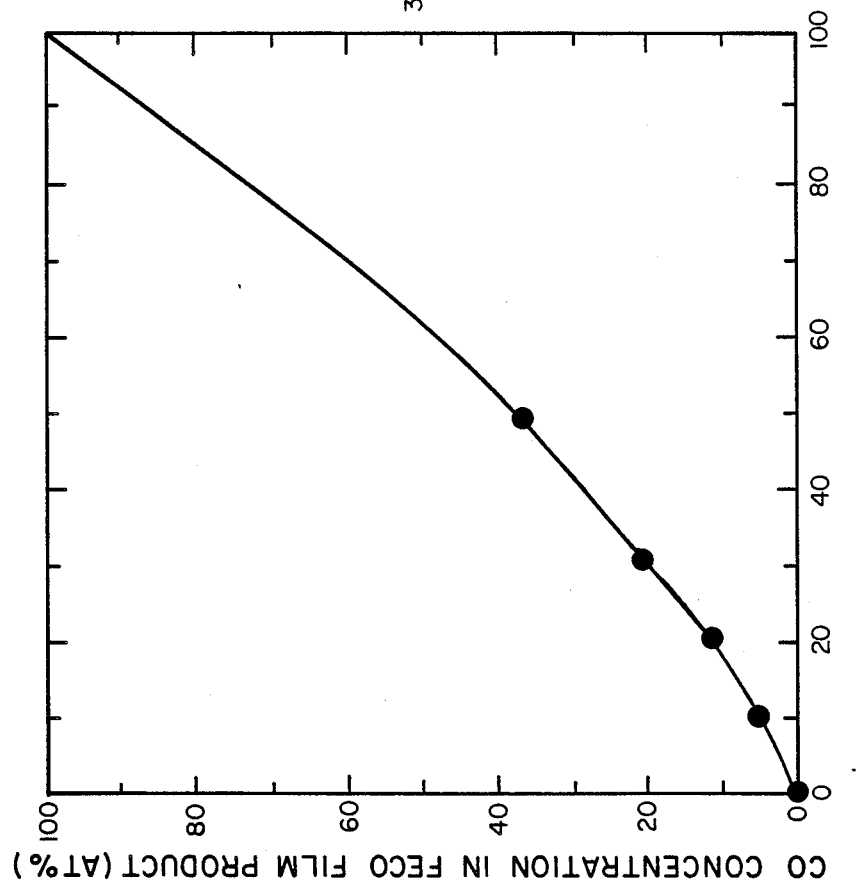
FIG. 4 shows the empirical relationship between the compositions of FeCo films and those of corresponding FeCo alloys.

The composition of the alloy in the film product of the invention can be predetermined and controlled by controlling the relative thicknesses of the alternating layers of the rare earth and transition metals. Any suitable means for controlling the relative thicknesses of the sequentially deposited layers can be used. For example, in a preferred embodiment of the invention, the composition of $Tb_x(Fe_{1-y}Co_y)_{1-x}$ from Tb and FeCo alloy evaporation sources can be controlled as follows. First, the ratio Y between Fe and Co is adjusted by evaporating a corresponding FeCo alloy utilizing the empirical result derived from FIG. 4 which shows the compositions of FeCo films vs. those of corresponding FeCo alloys. As the figure shows, ten atomic percent of Co should be used in an FeCo alloy to obtain five atomic percent of Co in the film product. The ratio X between the rare earth and the transition metal can be controlled by monitoring the deposition rates of two evaporated fluxes via corresponding quartz crystal sensors and using the following equation:

$$X = \frac{1}{1 + 2.74(L_{FeCo}/L_{Tb})}$$
$$= \frac{1}{1 + 2.74(R_{FeCo}/R_{Tb})}$$

where $L_{FeCo}$ and $L_{Tb}$ are sublayer thicknesses of FeCo and Tb, and $R_{FeCo}$ and $R_{Tb}$ are deposition rates of FeCo and Tb, respectively. For instance, when the thickness of the Tb layer is ¾ that of the FeCo layer, the resulting composition will contain 21 atomic percent Tb. The above equation is derived using the density and atomic weight of each component and can be verified by ICP analysis within experimental error.

The invention is further illustrated but is not intended to be limited by the following examples in which all parts and percentages are by atomic unless otherwise indicated.

Figure 5:
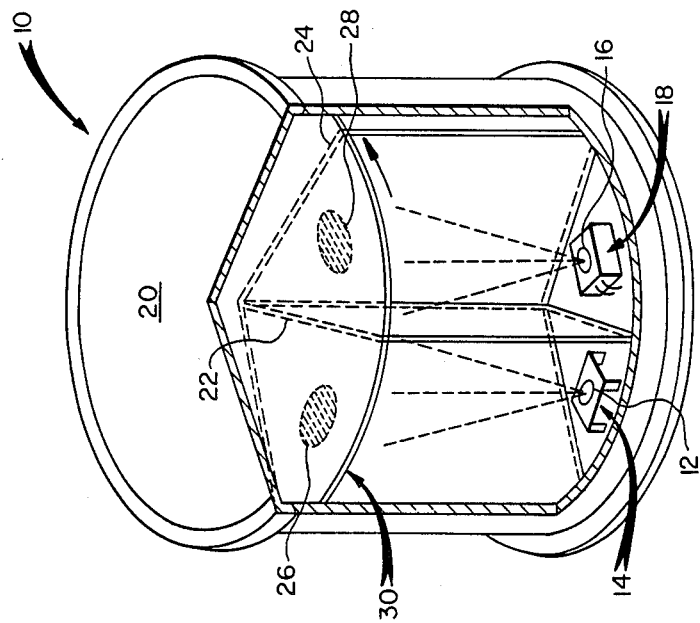
FIG. 5 is a schematic representation of a vacuum chamber used in the examples for sequential deposition of films of the invention on a substrate.

A vacuum chamber as shown in FIG. 5 having an 18 inch diameter and 36 inch height was used. A Tb element (99.99% purity lump) was evaporated from a resistive-heated tantalum boat and FeCo alloy (99.99% purity rod prepared by vacuum induction melting method) from an electron-beam heated crucible 18 of aluminum oxide one inch in diameter by ½ inch high. The composition of $Fe_{90}Co_{10}$ alloy was used to make the composition of $Fe_{95}Co_5$ in the film and a $Fe_{80}Co_{20}$ alloy was used to prepare $Fe_{90}Co_{10}$ in the film. The power sources were adjusted to deliver about 5 V/230 A and about 10 KV/0.7 A to evaporate Tb and FeCo, respectively. Two thermal sources 14 and 18 were physically separated by stainless steel plates 20, 22 and 24 to prevent cross contamination of the fluxes they evaporate. The source-to-substrate distance used was 20 inches. The evaporated fluxes were deposited on 2"×3"×0.002" sheet glass substrates 26 and 28 situated on rotating table 30. However any other sizes, shapes, and materials can be used such as polycarbonate, silicon wafers, Estar ™ polyester, aluminum, and the like.

A thin film of TbFeCo was deposited on the substrate by thermal evaporation of the Tb element and FeCo alloy in vacuum chamber 10 maintained at $1 \times 10^{-6}$ Torr during deposition. Substrates were mounted under the substrate table 30 which is rotated by a conventional motor (not shown) so that the rotational speed could be varied between 15–60 rpm by a motor control (not shown). Sequential deposition is achieved by rotating the substrates above the two sources so that the substrates are exposed alternately to the evaporated fluxes. The deposition rates from the two sources are monitored by corresponding quartz crystal sensors (not shown).

The repeat distance was varied by changing either the deposition rate or the rotation speed of the substrate or both. Although the repeat distance was varied from 3.5 angstroms to 70 angstroms, the ratio of sublayer thicknesses of Tb and FeCo was kept constant in all samples to make the same composition.

The composition, $Tb_{21}(Fe_{95}Co_5)_{79}$, was confirmed by inductively coupled plasma spectrometry to be the same in all films produced.

The growth parameters of the samples are listed in Table I. The total number of repeats was reduced with increasing repeat distance to obtain similar film thickness.

| | GROWTH PARAMETERS OF SEQUENTIALLY EVAPORATED Tb/FeCo | | | |
|---|---|---|---|---|
| Sample Code | Sublayer Tb | Thickness (Å) FeCo | Repeat Distance | Number of Repeats |
| I | 1.5 | 2.0 | 3.5 | 400 |
| II | 1.8 | 2.4 | 4.2 | 320 |
| III | 3.0 | 4.0 | 7.0 | 200 |
| IV | 6.0 | 8.0 | 14.0 | 120 |
| V | 9.0 | 12.0 | 21.0 | 67 |
| VI | 13.5 | 18.0 | 31.5 | 66 |
| VII | 18.0 | 24.0 | 42.0 | 47 |
| VIII | 30.0 | 40.0 | 70.0 | 20 |

Although the invention has been described in considerable detail in the foregoing, such detail is solely for the purpose of illustration. Variations can be made in the invention by those skilled in the art without departing from the spirit and scope of the invention except as set forth in the claims.

What is claimed is:

1. A method for producing magnetooptical recording media which comprises evaporating a rare earth metal and a transition metal and sequentially depositing the rare earth and transition metals on a substrate at a maximum repeat distance of 21 angstroms to form a nonhomogeneous, non-layered mixed film.

2. The method of claim 1 wherein the repeat distance is 14 angstroms or less.

3. The method of claim 2 wherein the repeat distance is 3.5 angstroms.

4. The method of claim 1 wherein Tb and FeCo are sequentially deposited on the substrate.

5. The method of claim 4 wherein the nonhomogeneous mixed film sequentially deposited on the substrate is $Tb_{21}(Fe_{95}Co_5)_{79}$.

6. the method of claim 4 wherein the film sequentially deposited on the substrate has a coercivity of 1.8 to 6 KOe and a Kerr rotation angle of 0.6°.

7. The method of claim 1 wherein the rare earth and transition metals are thermally evaporated and sequentially deposited on the substrate in a vacuum.

8. The method of claim 1 wherein the transition metal is iron, cobalt or mixtures thereof.

9. A nonhomogeneous, non-layered mixed magnetooptical recording film on a substrate comprised of Tb, Fe, and Co having a Kerr rotation angle of 0.6° and a coercivity of 1.8 to 6 KOe.

10. The film of claim 9 having a coercivity of about 2 KOe.

11. The film of claim 9 having the composition $Tb_{21}(Fe_{95}Co_5)_{79}$.

* * * * *